(12) United States Patent
Cooke et al.

(10) Patent No.: US 6,920,469 B2
(45) Date of Patent: Jul. 19, 2005

(54) UNIQUE ID MANAGEMENT IN DISCONNECTED DATABASE REPLICATION

(75) Inventors: Iain C Cooke, Edinburgh (GB); Gary S M Thomson, Edinburgh (GB); Lucy Bastin, Birmingham (GB)

(73) Assignee: Tadpole Technology PLC, Cambridge (GB)

( * ) Notice: Subject to any disclaimer, the term of this patent is extended or adjusted under 35 U.S.C. 154(b) by 415 days.

(21) Appl. No.: 09/991,369

(22) Filed: Nov. 13, 2001

(65) Prior Publication Data

US 2003/0093441 A1 May 15, 2003

(51) Int. Cl.$^7$ .............................................. G06F 17/30
(52) U.S. Cl. ...................... 707/203; 707/204; 707/200
(58) Field of Search ............................... 707/200–203, 707/1–10, 100; 709/229; 74/203

(56) References Cited

U.S. PATENT DOCUMENTS 5,560,005 A * 9/1996 Hoover et al. ................ 707/10
6,047,362 A * 4/2000 Zucker ....................... 711/203
6,408,336 B1 * 6/2002 Schneider et al. ........... 709/229
6,542,907 B1 * 4/2003 Cohen ......................... 707/203

OTHER PUBLICATIONS

Smallworld Software Documentation, Feb. 22, 2002.

* cited by examiner

Primary Examiner—Charles Rones
Assistant Examiner—Neveen Abel-Jalil
(74) Attorney, Agent, or Firm—William A. English; Cohen Sakaguchi & English LLP

(57) ABSTRACT

A system for managing identifiers in a database replication network includes a database including data items, and a global ID space including a number of identities (IDs) for identifying data items. A replica of the database includes an existing range of IDs allocated to the replica from the global ID space, and a replica ID manager for requesting a new range of IDs from the ID space when a threshold is reached. The replica ID manager adjusts the threshold based upon usage of IDs by the replica, calculates a size of the new range of IDs based upon an ID usage rate of the replica, and includes the size in the request. An ID administrator associated with the global ID space allocates a new range of IDs to the replica in response to the request, thereby providing unique global IDs to data items in replicas of the database.

9 Claims, 4 Drawing Sheets

UNIQUE ID MANAGEMENT IN DISCONNECTED DATABASE REPLICATION

FIELD OF THE INVENTION

The present invention relates generally to systems and methods for managing disconnected replicas of databases, and more particularly to systems and methods for dynamically allocating ranges of unique identities for data items in replicas of a database.

BACKGROUND

It is often advantageous to take one or more complete or partial copies of a database onto separate computer systems or sites and operate application software against each copy of the database. There exist many methods for managing and re-synchronizing the database copies so that they maintain substantially the same data content. There also exists many methods for reconciling conflicting changes made at different sites.

For most data items within any given database record, the value of that item represents some aspect of the real world, and may be any value within the allowed range of values. In addition, it is also common to find data items that exist to facilitate managing the data efficiently and are often not meaningful to users. These items are typically referred to as unique identities, or simply as IDs, which are generally allocated by the database system. In most cases, each ID provides a globally (within the database system) unique identifier for a data record, and it is vital to the integrity of the data that duplicate IDs are never created.

In the case of replicas of a database, which logically form a single database system, and which exchange data between them to remain substantially identical in content, the IDs should remain globally unique across all replicas. If this constraint is not maintained, then there may be a conflict when changes from one replica are applied to another. In the case where IDs are used to identify records, it is often not practical to change the ID for a record. The record may be referred to by many other records, potentially by information beyond the reach of the system, and the database or application programs may not have sufficient knowledge or access to modify all of the referencing information.

It is therefore important in these cases to have a method for generating IDs within a set of systems that communicate only periodically, with the goal that the IDs generated on each system will be globally unique across the aggregate of all the systems. Two main methods are commonly used to try to solve this problem.

First, in ID space partitioning, a replica is given a large range of IDs that it "owns" at the time the replica is created. That replica is the only system that is permitted to allocate IDs within the owned range. By pre-allocating sections of the total available ID space to individual replicas, there is no possibility that two different replicas will generate the same ID.

The drawback with this method, however, is that in order to avoid a replica running out of IDs that it may assign to data items, the range owned by that replica must be large. If the total system includes many replicas, then the ID space may be subdivided to the point where what may seem initially like a relatively large space (e.g., 32 bits=roughly 4 billion individual IDs) may rapidly become restrictive. The result is that the size of the IDs must be larger than is necessitated by the likely number of records, with consequent increases in database storage size, data access times, and other detrimental effects.

Alternatively, to reduce the size of the system-wide ID space, probability-based approaches may be used. This approach includes defining the IDs within a sufficiently large range such that there is a low probability that a random allocation of an ID within the range will suffer a clash with any other IDs previously allocated. Clearly, for this to be a reasonable proposition, the ID space needs to be sufficiently large. For certain configurations with unpredictable distribution of ID allocation between replicas, however, it may still result in smaller ID space requirements than the partitioning approach. Overall, this approach has the same basic drawbacks as the partitioning approach, with the extra drawback that there remains a small but non-zero probability that a clash may, in fact, occur.

Accordingly, it is believed that systems and methods for allocating identities to replicas of databases to reduce the likelihood of conflicts would be considered useful.

SUMMARY OF THE INVENTION

The present invention is directed generally to systems and methods for managing disconnected replicas of databases, and more particularly to systems and methods for dynamically allocating ranges of unique identities to replicas of a database that may be assigned to data items in the respective replicas.

In accordance with a first aspect of the present invention, a system is provided for managing identifiers in a database replication network. Generally, the system includes a database including a plurality of data items, and an ID space including a number of identities (IDs) for identifying data items included in the database. The system also includes one or more replicas of at least a portion of the data items in the database.

Each replica may include an existing range of IDs allocated to the replica from the ID space, and a replica ID manager associated with the replica for requesting a new range of IDs from the ID space when IDs in the existing range of IDs reaches a predetermined threshold. The replica ID manager may be capable of adjusting the predetermined threshold based upon a usage rate of IDs by the replica. In addition, the replica ID manager may be responsible for assigning IDs from the replica ID space to data items in the replica to identify the respective data items.

Preferably, the replica ID manager calculates the size of the new range of IDs based upon the ID usage rate of the replica. The size of the desired new range of IDs may be included in the request for a new range of IDs.

The system also includes an ID administrator associated with the ID space, the ID administrator configured for receiving requests for ranges of IDs. Preferably, the ID administrator is configured for allocating a new range of IDs to the replica in response to the request from the replica ID manager. In one embodiment, the ID administrator is a subsystem of the database, while in another embodiment, the ID administrator may be resident at a different site than the database, and may communicate with the database and/or replicas via a communications link. Preferably, the ID administrator allocates new ranges of IDs such that any new ranges of IDs exclude any IDs previously allocated by the ID administrator to a replica.

In accordance with another aspect of the present invention, a method is provided for managing identifiers allocated to one or more replicas of a database. Generally, the database includes a data space including a plurality of data items, and a global ID space including a plurality of identities (IDs) for identifying data items.

A first range of IDs may be allocated from the global ID space to a replica of the database. A request may be received from the replica for a second range of IDs, whereupon a second range of IDs may be allocated from the global ID space to the replica. Preferably, a size of the second range of IDs is selected based upon a usage rate of IDs by the replica. For example, the size of the second range of IDs may be selected based upon at least one of an average usage rate of IDs, a current usage rate of IDs, and a rate of change of usage rate of IDs over time by the replica.

In one embodiment, a request may be submitted from the replica for the second range of IDs. The request may be received by an ID administrator associated the global ID space, which may allocate the second range of IDs from the global ID space in a manner that prevents conflict with IDs allocated to another replica. Preferably, the request for a second range of IDs is submitted when a predetermined number of available IDs in the first range of IDs reaches a trigger point.

In accordance with yet another aspect of the present invention, a method is provided for managing identifiers allocated to a replica of a database including a data space including a plurality of data items, and a global ID space comprising a plurality of identities (IDs) for identifying data items. The replica may include a replica ID space including a plurality of IDs allocated from the global ID space. Usage of IDs by the replica may be monitored, for example, by an ID manager associated with the replica ID space.

A request may be submitted, e.g., by the ID manager, for a new range of IDs from the global ID space when the IDs from the plurality of IDs remaining unused by the replica reaches a predetermined threshold. Preferably, the request includes a size of the new range of IDs being requested, the size being based upon a usage rate of IDs by the replica.

In one embodiment, the replica may be a first replica that intermittently communicates with a second replica of the database, e.g., a master copy, for synchronizing data between the first and second replicas. The size of the new range of IDs in any request may be selected to provide sufficient numbers of IDs for the first replica to satisfy ID usage by the first replica between successive communications with the second replica. Alternatively, the replica may intermittently communicate with an ID administrator managing the global ID space, and the size of the new range of IDs may be selected to provide sufficient numbers of IDs for the replica to satisfy ID usage by the replica between successive communications with the ID administrator.

Other objects and features of the present invention will become apparent from consideration of the following description taken in conjunction with the accompanying drawings.

DETAILED DESCRIPTION OF THE PREFERRED EMBODIMENTS

Figure 1:
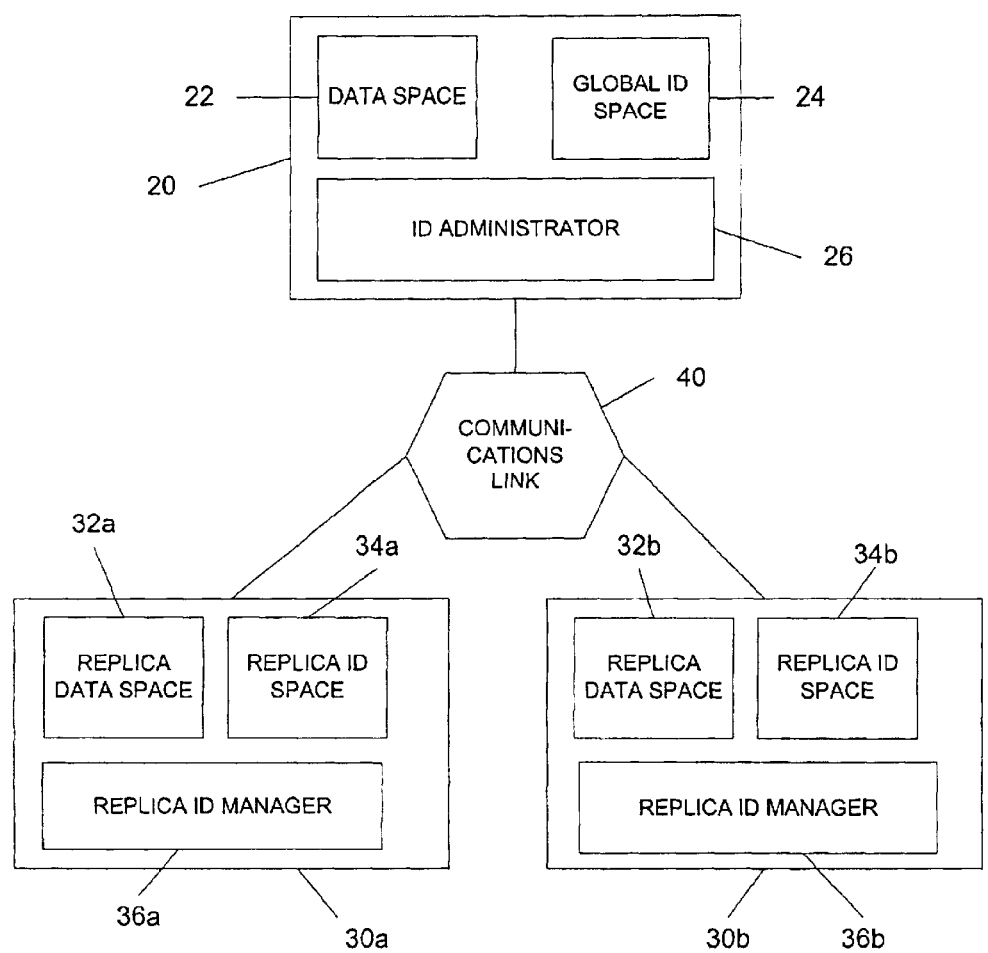
FIG. 1 is a schematic of a system for allocating IDs between a database and replicas of the database, in accordance with the present invention.

Turning now to the drawings, FIG. 1 shows a preferred embodiment of a disconnected database replication system 10, including a master database 20, an ID space 24, an ID administrator 26, and a plurality of replicas 30. Although only two replicas 30a, 30b are shown, it will be appreciated that any number of replicas 30 (one or more) may be created and managed in accordance with the present invention.

The master database 20, ID administrator 26, and/or replicas 30 may communicate with one another, e.g., may be connected either directly or intermittently via a communications link 40. In one embodiment, the communications link 40 may be a network, e.g., a local area network ("LAN"), an Intranet, and/or a wireless communications network (not shown). Thus, the master database 20 and replicas 30 may simply be different computers and/or users at a single location. Alternatively, the network 40 may be a wide area network, e.g., including a plurality of several different types of networks, including, but not limited to, a LAN, an Intranet, or a wireless network. An example of such a network is the Internet. In a further alternative, the communications link 40 may be a dial-up link or other connection, e.g., via a telecommunications network. Thus, in the latter alternatives, the master database 20 and replicas 30 may be located at a plurality of separate physical locations or sites.

The master database 20 may be provided on a computing device, such as a server or other computer, that may include one or more processors and/or memory (not shown). It will be appreciated by those skilled in the art that the master database 20 and/or the computing device may include integrated or separate hardware components and/or software modules to support its operation.

Generally, the master database 20 includes a data space 22, including a plurality of data items, e.g., records, states, and/or versions, that may be stored in the memory of the computing device. The data items within any given database record may have a value that represents some aspect of the real world, and may be any value within the allowed range of values. In an exemplary embodiment, the data records may be related to geographic information systems, e.g., mapping and analysing spatial data, such as geographic data, and/or engineering designs. The subject matter of the data space 22, however, is not important to the present invention, except that one of the goals of the present invention is to facilitate synchronizing data and/or preventing conflicts between data items in disconnected replicas.

The replicas 30 may be provided on separate computing devices, such as desktop computers or other fixed workstations, and/or mobile or portable devices, such as laptops, personal digital assistants ("PDA's"), and the like (not shown). Each replica 30 may include one or more processors and/or memory (not shown), similar to the master database 20 above, for supporting its operation. Each replica 30 generally includes a replica data space 32 stored in memory of the computing device, which may be a replica of all or a portion of the data space 22 of the master database 20.

The ID space 24 includes a range of available identities or "IDs" that may be allocated to the master database 20 and/or the replicas 30. The IDs may be used as unique identifiers to identify data items added to, modified in, and/or deleted from the data spaces 22, 32 of the master database 20 and/or the replicas 30. The ID space 24 may have a fixed size globally, although allocation of the IDs from the ID space 24 to the master database 20 and/or the replicas 30 may change dynamically, as explained further below. Alternatively, a plurality of ID spaces (not shown) may be provided, e.g., associated with individual tables or other subsystems of the data space 22. Ranges of IDs available in each of these ID spaces may be allocated in a similar manner to that described below for a single ID space 24, as will be appreciated by those skilled in the art.

The ID administrator 26 is responsible for allocating IDs from the ID space 24 to the master database 20 and/or to each of the replicas 30. The ID administrator 26 generally has ultimate allocation authority over the ID space 24 in order to prevent allocation errors or conflicts. Optionally, the ID administrator 26 may perform other operations not important to the present invention, such as generating a replica data space to create a replica, synchronizing replicas 30 with each other and/or with the master database 20, and/or resolving conflicts.

In the embodiment shown, the ID space 24 and the ID administrator 26 are part of the master database 20, i.e., may be modules or subsystems in the server or other computing device (not shown) supporting the master database 20. Alternatively, the ID space 24 and/or ID administrator 26 may be provided on one or more separate devices and/or at one or more different locations than the master database 20. Consequently, the ID administrator 26 may communicate with the master database 20 via the communications link 40. Thus, the ID space 24 and the ID administrator 26 may be directly or indirectly associated with the master database 20. If the ID space 24 and ID administrator 26 are indirectly associated with the master database 20, the master database 20 may be a peer copy of an original database, similar to the replicas 30.

Each replica 30 includes a replica ID space 34, including a range of IDs allocated to the respective replica 30 from the ID space 24. In addition, each replica 30 includes an ID manager 36 for receiving and/or requesting ranges of IDs from the ID space 24. The IDs available in the replica ID space 34 may be assigned to records or other data items added to, modified in, and/or deleted from the replica data space 32, e.g., in a monotonic manner as described further below. Similarly, the master database 20 may include its own allocated ID space and/or ID manager (not shown) that may operate similar to those included in each of the replicas 30, particularly if the ID space 24 and the ID administrator 26 are indirectly associated with the master database 20.

Figure 2:
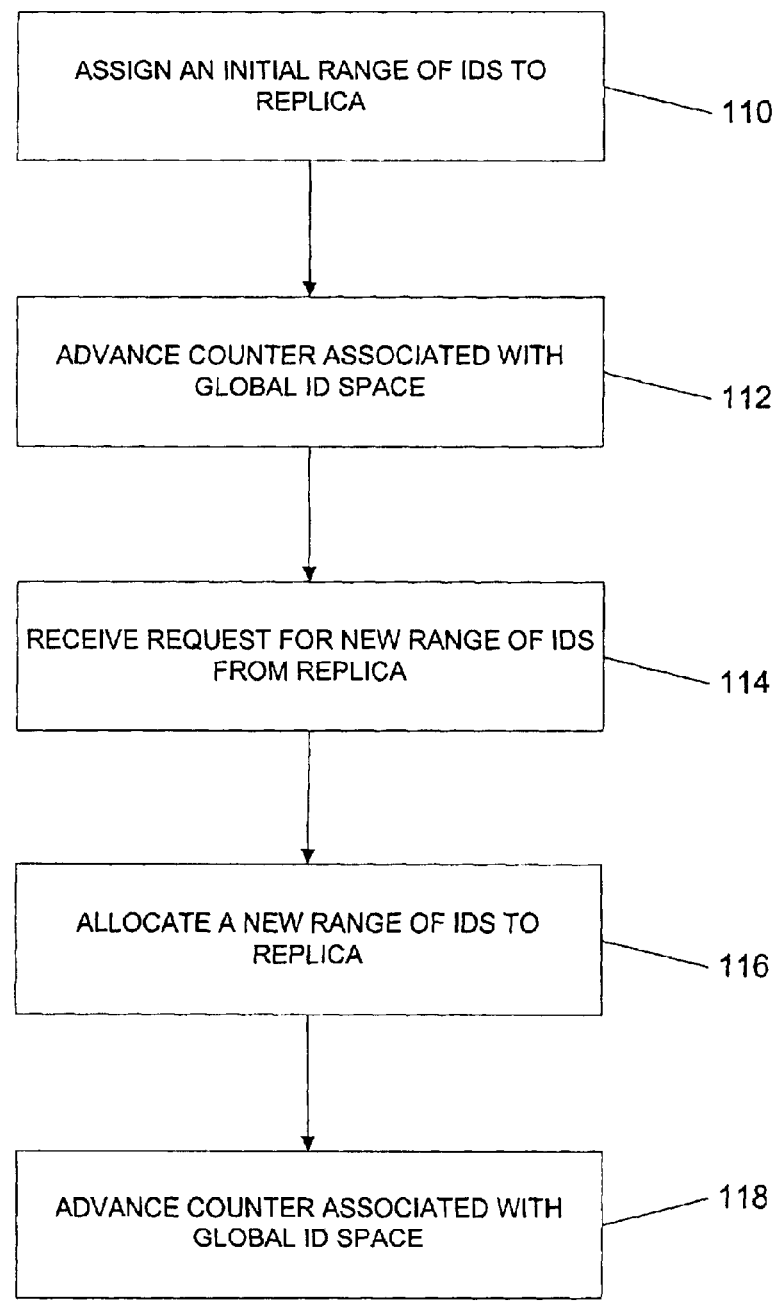
FIG. 2 is a flowchart showing a method for allocating ranges of IDs to disconnected replicas of a database.

Turning to FIG. 2 (with continued reference to FIG. 1), a method is shown for allocating ranges of IDs, e.g., using the ID administrator 26. First, at step 110, when a replica 30 is created, an initial range of IDs may be allocated to the replica 30 by the ID administrator 26. The range may simply include two values, e.g., a lower limit and an upper limit of the range, or another mechanism for defining a contiguous range of IDs. Alternatively, the ID administrator 26 may allocate a range of IDs including a unique set of noncontiguous IDs, although this may be disfavored because of the increased management involved. The default value of the range of IDs may be fixed, or may be selected based upon a size of the data space 22 upon which the replica 30 is based, an anticipated rate of usage of IDs by the replica 30, or other factors.

Preferably, the IDs in each range of IDs initially allocated to each replica 30, and subsequently allocated in response to each request, are unique from the IDs allocated in previous ranges of IDs by the ID administrator 26. Thus, when a replica assigns a particular ID to one or more data items, those data items may be uniquely identified globally, i.e., throughout the database system 10. This may substantially eliminate the risk of conflicts, i.e., that multiple replicas may assign different data items to the same ID.

At step 112, the ID administrator 26 may advance a counter to the upper limit of the range of IDs assigned. For example, if the counter is initially at a value "x," generally an integer, and the range of IDs has a size $n_1$, the counter may be advanced to $(x+n_1-1)$. Thus, the range of IDs initially allocated includes the values from x, (x+1), ... $(x+n_1-1)$ in this example.

At step 114, the ID administrator 26 may receive a request from the ID manager 36 of a replica 30 for an additional range of IDs from the ID space 24. The request may originate from any one of the replicas 30 associated with the master database 20 (or may originate from the master database 20 itself). In response to the request, the ID administrator 26 may allocate a new range of IDs from the ID space to the replica 30 (or to the master database 20), and transmit the new range of IDs back to the ID manager 36 of the respective replica 30. Alternatively, the ID administrator 26 may periodically query each ID manager 36 to inquire whether the respective of replica ID space 35 is running out of IDs, rather than wait for the ID manager 36 to initiate a request.

At step 118, the counter may be advanced to the upper limit of the new range of IDs. The range of IDs allocated in response to a request generally start at the point to which the counter was previously moved. Continuing the previous example, if a new range of IDs having a size $n_2$ is allocated in response to the request, the counter may be advanced to $(x+n_1+n_2-1)$. Thus, the range of IDs allocated includes the values $(x+n_1)$, $(x+n_1+1)$, ... $(x+n_1+n_2-1)$.

These steps may be repeated during the life of the database system, e.g., each time an additional replica 30 is created, and/or each time a request is received from a replica 30 for a new range of IDs. The counter may be advanced after each request/allocation transaction, thereby ensuring that a unique set of IDs is allocated to the replicas in response to each request.

When the ID administrator 26 transmits a reply to the ID manager 36 of the replica 30 including its new ID range, the IDs allocated to the replica 30 may be removed from the list of IDs available for subsequent allocation (or that the master database 20 owns if the ID space 24 is directly associated with the master database 20). Conversely, the IDs allocated to the ID space 24 may not be allocated to any other replica, nor to the master database 20. In most implementations, this is achieved automatically by advancing the counter to the upper limit of each new range of IDs allocated to a replica, as described above, although alternatively, the ID administrator 26 may inventory each individual ID.

Figure 3:
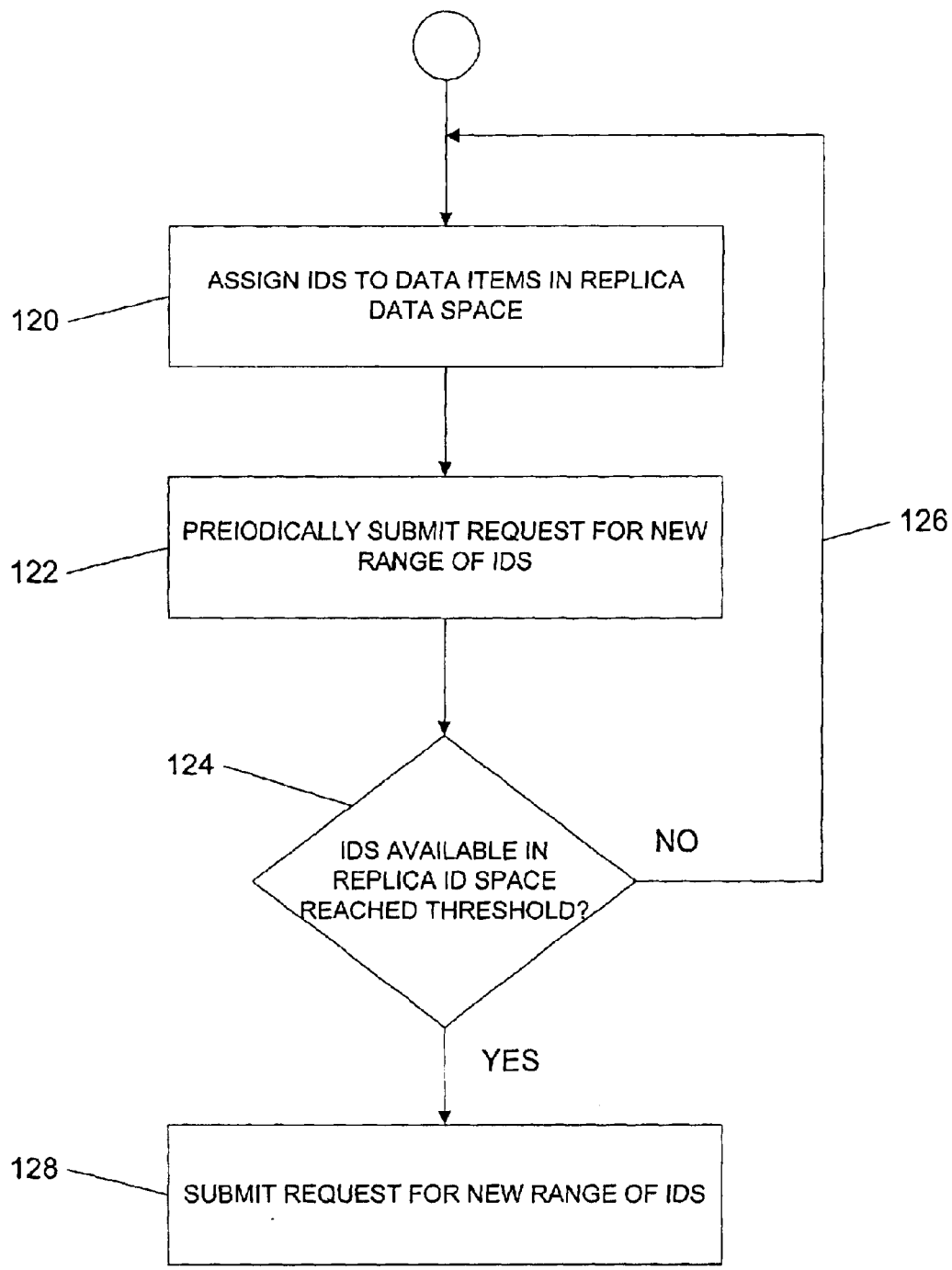
FIG. 3 is a flowchart showing a method for managing IDs being used by a disconnected replica of a database.

Turning to FIG. 3 (with continued reference to FIG. 1), a method is shown for managing the replica ID space 34 of a replica 30 using an ID manager 36 associated with the replica 30. Generally, the ID manager 36 may be a module or subsystem of the replica 30 for monitoring usage of an existing range of IDs allocated to the respective replica 30. At step 120, the ID manager 36 may be responsible for assigning IDs from the replica ID space 34 to data items added to, modified in, and/or deleted from the replica data space 32, although alternatively this responsibility may be assigned to another subsystem (not shown) of the replica 30.

At step 122, the ID manager 36 may periodically submit a request to the ID administrator 24 for a new range of IDs. For example, the replica 30 may periodically connect with the master database 20 (and/or other replicas 30) to synchronize and/or exchange data. It may be efficient to include a request for a new range of IDs while the replica 30 is already connected to the master database 20, e.g., to "top off" the range of IDs available in the replica ID space 34, as explained further below.

Alternatively, or in addition, at step 124, the ID manager 36 may monitor the replica ID space 34 to determine whether the available IDs have fallen to a predetermined threshold. For example, the ID manager 36 may monitor whether the number of IDs in the replica ID space 34 still available for assignment to data items is reduced to a predetermined number of IDs, i.e., thereby defining a trigger point. Alternatively, the ID manager 36 may monitor the used IDs for a predetermined value to be used or a predetermined level of used IDs to be reached. If the available IDs still exceeds the trigger point, the ID manager 36 may resume previous operations, e.g., assigning IDs, as indicated by 126.

Once the available IDs falls to the trigger point, the ID manager 36 may act, e.g., to submit a request for a new range of IDs at step 128. Preferably, the trigger point takes into account a safety factor, e.g., based upon an expected worst-case amount of time before a request/allocation transaction may be completed. For example, assume that the normal size of a new range of IDs that is allocated to a replica during a request/allocation transaction is two thousand (2,000) IDs, and that a factor of safety of three (3) is desired. If the replica 30 connects with the master database 20 only once per day, then the ID manager 36 would want to ensure that the replica ID space 34 has sufficient available IDs to satisfy three days worth of usage. Therefore, the trigger point would be 6,000 available IDs in the replica ID space 34.

When the new range of IDs is received by the ID manager 36 of a replica 30, the new IDs are added to the replica ID space 34. Thus, a replica 30 may "own" a plurality of ID ranges in the replica ID space 34, e.g., an initial range and one or more new ranges added in response to requests for additional IDs.

The replica ID space 34 may also be divided another way, i.e., between the "working" ID range including IDs currently being assigned to data items, and zero or more "stock" ID ranges for when the working range is depleted. The stock ID ranges may become the working range in turn when the IDs in the current working range are exhausted. Most of the time, a replica may own no more than one new range for any ID space, although the systems and methods of the present invention may allow for multiple ranges of IDs being allocated to a replica, which may increase the flexibility of the system. Thus, the ID manager 36 may monitor usage of IDs by the replica 30 to ensure that, when the last ID in a first range (the working range) is used, the next ID assigned to a data item is from the next available range owned by the replica 30.

Optionally, the ID manager 36 may issue a warning to a user of the replica 30 once the trigger point is reached (not shown in FIG. 3), e.g., to allow the user to initiate connection with the master database 20 and/or ID administrator 26. This operation may be particularly useful for a replica 30 that is substantially isolated from the master database 20 and/or system administrator 26, e.g., is only connected when the user affirmatively decides to initiate a connection. Thus, the ID manager 36 may provide sufficient warning to allow the user to connect with the master database 20 and/or the ID administrator in order to receive another range of IDs without disrupting use of the replica 30.

Another purpose of the ID manager 36 of a replica 30 may be to determine the size of a new range of IDs to be allocated to the replica 30. Generally, the size may be determined based upon usage of IDs by the replica 30. For example, the ID manager 36 may monitor the rate at which the replica 30 uses IDs and include a particular size range of IDs in its request to the ID administrator 26 that is based upon this usage rate. The usage rate may be an average usage rate, e.g., total IDs used by a replica divided by a total number of requests made by the replica. Alternatively, a current usage rate may be used, e.g., the number of IDs used by the replica 30 since its last connection to the master database 20. In a further alternative, a rate of change of ID usage over time may be used to calculate the size of the range of IDs to request, e.g., to adjust for trends of increasing or decreasing usage by the replica 30.

Alternatively, the process of determining the size of the new range of IDs may be performed by the ID administrator 26 rather than the ID manager 36. However, the ID manager 36 of the replica 30 may be better able to monitor trends in ID usage by the replica 30 between connections with the ID administrator 26, and therefore may provide a finer granularity.

Although the ID administrator 26 may set default values for the size of ID ranges allocated to the replicas 30, monitoring use of the IDs, e.g., by the ID manager 36 of each replica 30, may provide a basis for self-tuning range sizes, if appropriate. Thus, the replica ID space 34 for different replicas 30 may have a different ideal range size, and that the ideal range size may well vary between replicas of the same database and/or over time.

Preferably, the size of the range of IDs allocated to the replica 30 is such that the replica 30 needs to communicate only intermittently with the master database 20, e.g., during fixed periodic intervals. Depending upon the application, the size of the database system, and/or other factors, the frequency at which the replica 30 communicates or connects with the master database 20 may be a matter of seconds, minutes, hours, or even days, as will be appreciated by those skilled in the art.

Thus, a system administrator or other operator overseeing the database system 10 may configure the ID manager(s) 34 and/or ID administrator 24 for target thresholds, range sizes, and/or other parameters. For example, if a target connection time is once per day and a safety factor of three (3) is selected, the ID manager may try to maintain three days average usage of IDs available in the replica ID space. Thus, during normal operation, the size of the available IDs in the replica ID space may range from three to four (3–4) days of ID usage.

Figure 4:
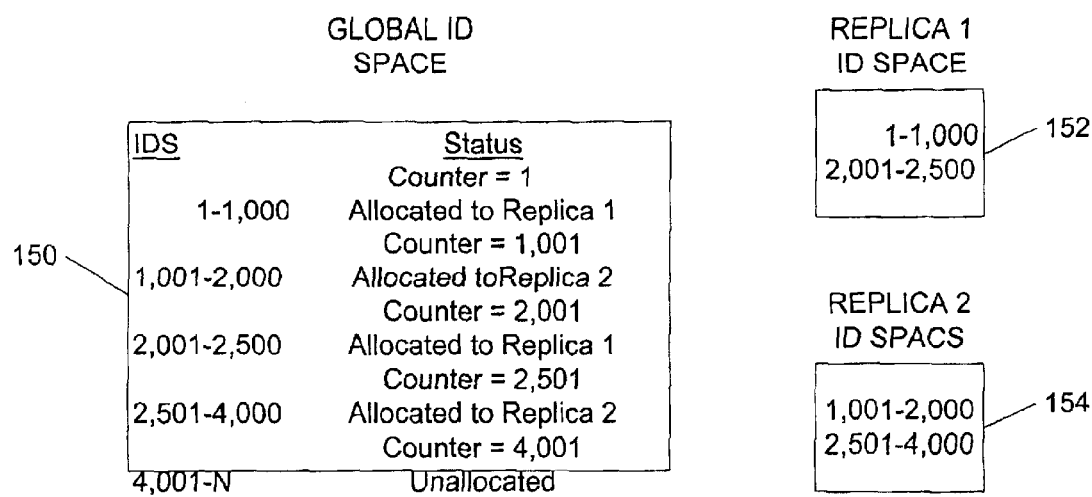
FIG. 4 shows an exemplary allocation of IDs to disconnected replicas of a database from a global ID space.

Turning to FIG. 4, an exemplary arrangement of IDs allocated between two replicas of a disconnected database is shown. The database includes one or more global ID spaces 150 (one shown), including the entire range of IDs available for assignment to data items of the database. As explained above, if the database includes multiple tables or separate data spaces, a separate global ID space may be associated with each data space. In the example shown, the global ID space 150 includes a range starting at one (1) and continuing to greater than four thousand (4,000), i.e., to some finite integer "N."

Initially, the counter is set to one (1), although alternatively any other integer may be used. When Replica 1 is created, its replica ID space 152 is allocated a range of IDs (e.g., a default range), e.g., one thousand (1,000) IDs, ranging from 1–1,000. The counter of the global ID space may then be advanced from one (1) to one thousand and one (1,001). When Replica 2 is created, its replica ID space 154 is also allocated a range of IDs, e.g., one thousand (1,000) IDs, ranging from 1,001–2,000. Thus, the new range of IDs begins at the current counter point, whereupon the counter may be advanced to the upper limit of the new range of IDs, e.g., to 2,001.

Subsequently, e.g., in response to a request from Replica 1, its replica ID space 152 may be allocated another range of IDs, e.g., five hundred (500) IDs, ranging from 2,001–2,500, whereupon the counter may again be advanced to the upper limit, 2,501. Finally, in response to a request from Replica 2, its replica ID space 154 may be allocated fifteen hundred (1,500) IDs, ranging from 2,501–4,000. The counter may be advanced to 4,001, indicating that the IDs ranging from 4,001-N continue to be available in the global ID space 152 for allocation to Replicas 1, 2, or any other new replicas created. Although in the example shown, the ID administrator (not shown) managing the global ID space 150 may keep track of which ranges have been allocated to which replicas, this extra level of management may be unnecessary, since the counter ensures that no overlapping or duplicate range of IDs is allocated to multiple replicas.

Thus, the systems and methods in accordance with the present invention provide a dynamic method for managing the ID space of database replication system. For example, they may facilitate supporting more replicas for a given size of ID space than other methods, yet substantially eliminate the possibility of ID allocation conflicts.

The size of the range of IDs allocated to a replica may be determined based upon the following criteria. First, after considering all other factors, smaller ranges are better.

Second, the ranges may be large enough to cover substantially all of the allocation needs within a replica until it is next able to communicate with the master database. This may depend on the usage and connection profiles of the particular implementation and application. In most cases, a "safety factor" may be built into a calculation to substantially reduce the chances of a replica reaching the end of its allotted range(s) of IDs before it has a chance to be allocated another range.

Finally, the range may be large enough such that the overhead of the management process does not create a significant communications or processing burden in relation to other normal processes. In most circumstances, the target may be to require allocation of an ID range to a replica infrequently and/or a fixed periods, e.g., no more than a few times a day.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A method for managing identifiers allocated to one or more replicas of a database, the database comprising a data space comprising a plurality of data items, a global ID space comprising a plurality of identities (IDs) for identifying data items, the method comprising:

allocating a first range of IDs from the global ID space to a replica of the database;

receiving a request from the replica for a second range of IDs; and providing a second range of IDs from the global ID space to the replica, a size of the second range of IDs being selected based upon a usage rate of IDs by the replica.

2. The method of claim 1, wherein the size of the second range of IDs is selected based upon at least one of an average usage rate of IDs, a current usage rate of IDs, and a rate of change of usage rate of IDs over time by the replica.

3. The method of claim 1, wherein the replica comprises a first replica, and wherein the first replica intermittently communicates with a second replica of the database for synchronizing data between the first and second replicas.

4. The method of claim 3, wherein the size of the second range of IDs is selected to provide sufficient numbers of IDs for the first replica to satisfy ID usage by the first replica between successive communications with the second replica.

5. The method of claim 4, wherein the second replica comprises a master copy of the database.

6. The method of claim 1, further comprising submitting a request from the replica for the second range of IDs, and wherein the request is received by an ID administrator associated the global ID space, the ID administrator allocating the second range of IDs from the global ID space in a manner that prevents conflict with IDs allocated to another replica.

7. The method of claim 6, wherein the request for a second range of IDs is submitted when a predetermined number of available IDs in the first range of IDs reaches a trigger point.

8. A method for managing identifiers allocated to a plurality of replicas of a database comprising a data space including a plurality of data items, and an ID space comprising a plurality of identities (IDs) for identifying data items, the method comprising:

allocating a first range of IDs $n_1$ from the ID space to a first replica of the database, the IDs in the first range ranging from (x) to (x+$n_1$-1), x being an integer;

allocating a second range of IDs $n_2$ from the ID space to a second replica of the database, the IDs in the second range ranging from (y) to (y+$n_2$-1), y being an integer greater than (x+$n_1$-1);

receiving a request from a replica of the master database for a third range of IDs; and providing the third range of IDs from the ID space to the requesting replica, a size $n_3$ of the third range of IDs being selected based upon a usage rate of IDs by the requesting replica, the IDs in the third range ranging from (z) to (z+$n_3$-1), z being an integer greater than (y+$n_2$-1).

9. The method of claim 8, wherein the replica receiving the third range of IDs is the first replica, and wherein the request is generated when a predetermined number IDs from the first range of IDs remain unused by the first replica.

* * * * *